United States Patent Office 3,464,801
Patented Sept. 2, 1969

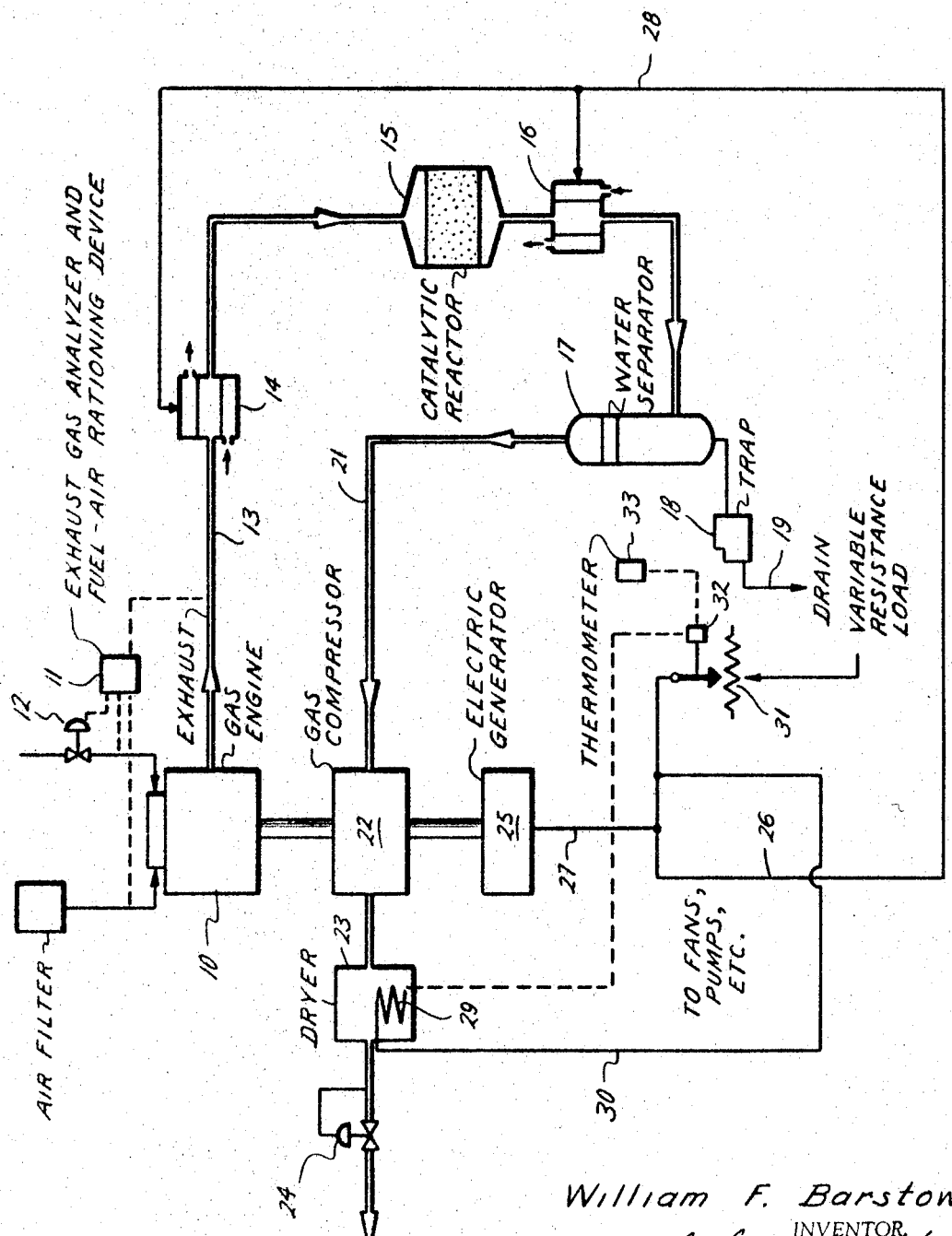

3,464,801
CATALYTIC SYSTEM FOR INERT GAS GENERATION
William F. Barstow, Houston, Tex., assignor to The Tenex Corporation, Houston, Tex., a corporation of Texas
Filed Sept. 28, 1964, Ser. No. 399,804
Int. Cl. B01j 7/00, 9/16
U.S. Cl. 23—288                                      4 Claims

ABSTRACT OF THE DISCLOSURE

This patent discloses an inert gas generating system in which exhaust gases from an internal combustion engine are reacted over a catalyst, cooled, separated from water and compressed in a compressor driven by the engine. The engine also drives a power absorption means such as an electrical generator for generating power for any desired purpose. The gas is compressed against a back pressure.

---

This invention relates to a system for generating inert gas utilizing the exhaust gases of an internal combustion engine.

In my Patent No. 3,000,707 there is a detailed discussion of the use of exhaust gases from an engine as inert gas, and of the manner in which the engine exhaust gases may be rendered inert by passing them over a suitable noble metal catalyst. Reference is made to my prior patent for a complete discussion of this basic process.

An object of this invention is to provide a system for generating inert gas in which a single internal combustion engine may be utilized to generate all of the gas to be compressed by the engine.

The single figure is a flow diagram illustrating this invention.

When an internal combustion engine is sized to a compressor to compress gas, it will be found that the exhaust gases from the engine are not sufficient because the compressor is capable of compressing more gas than generated by the engine. By this invention, an oversize engine is used which will generate sufficient exhaust gases. The additional horsepower produced to manufacture such gases is utilized to provide power for other components of the system.

The gas engine 10 may be any internal combustion engine which operates on any hydrocarbon fuel such as natural gas, propane, butane, etc. Inasmuch as the single engine is the single source of gases to be compressed and contains the oxides of nitrogen to be removed, the engine is operated with a slight excess of fuel over that needed for stoichiometric combustion to provide the reductants needed to remove the oxides of nitrogen.

In order to operate the engine rich, means are provided for continuously analyzing the exhaust gases and regulating the flow of fuel to obtain the desired mixture. This system may include any suitable analyzing device, such as a thermal conductivity unit, which analyzes for hydrogen, one of the reductants desired. The percentage of carbon monoxide which will normally be present with a given amount of hydrogen is well known, and the system may be calibrated for the total reductants present with a given analysis. The analyzer 11 controls the setting of fuel valve 12 to provide the desired amount to fuel in response to the condition of the exhaust gas as indicated by the analyzer.

The exhaust gas passes through line 13 to cooler 14, which may be of any conventional type. Preferably, the exhaust is passed in indirect heat exchange with a suitable cooling medium such as air. If desired, the cooling water from the engine may be circulated by a suitable pump through the same heat exchanger.

The cooled exhaust gases pass to the catalytic reactor 15 which is provided with a noble metal catalyst which may be ether platinum or palladium.

As the reaction is exothermic, the gases are then cooled in the heat exchanger 16. In the reactor 15, the hydrogen and carbon monoxide react wih the oxides of nitrogen and any oxygen present and result in a substantially inert gas.

From the heat exchanger 16, the exhaust gases pass to the water separator 17 wherein free water passes out to the trap 18 and thence to drain through line 19.

The gas passes from the water separator through line 21 to the gas compressor 22. Gas compressor 22 is driven by gas engine 10 and may include one or more compressors to provide several stages of compression.

The compressed gas is then dried in a dry desiccant drier 23. While the drier is shown downstage from the compressor, it will be appreciated that it might be positioned between stages of compression.

From time to time the system may be used to provide gas at different or varying pressures. In accordance with this invention, it is desired that the gas compressor utilize as much horsepower from the engine as possible, and for this purpose a back pressure valve 24 is provided in the outlet from the gas compressor and is set to maintain a back pressure against the gas pressure of a selected amount. This will insure that the compressor will draw a constant horsepower from the engine.

The engine 10 will always have excess horsepower over that required by the gas compressor when generating the amount of gases needed to fully load the compressor. This additional horsepower may be dissipated in any desired form by placing an additional load on the engine. Any electric, hydroelectric or mechanical means of dissipating the load may be used. Preferably, the engine is loaded with an electrical generator 25 which absorbs the remaning horsepower to fully load the gas engine 10. The power generated by generator 25 is then used to provide power for the auxiliary items of the system. These items may include pumps, lights, fans, and the like, which will draw a constant load. This constant load is delivered through line 26 to the pumps, fans, etc. as illustrated by line 28 leading to the two heat exchangers 14 and 16.

Additionally, there may be equipment in the system which opeartes intermittently. For instance, the drier 23 may utilize a heat coil 29 to regenerate the desiccant. Coil 29 receives power from coil 27 through line 30.

In the event the auxiliary equipment will not absorb all of the current generated by the generator 25, a resistance load 31 is provided to dissipate the remaining horseower. Preferably, the resistance load 31 is variable so that it may be increased when the intermittently operated equipment is off. In order to provide for automatic operation, a controller 32 which senses the load on heater coil 29 is provided which is operated when heater coil 29 is turned on and off to vary the amount of the resistance load 31 and maintain the load on the electric generator constant.

It will be found that atmospheric conditions will change the load on the system, and the controller 32, sensing changes in atmospheric conditions by thermostat 33, automatically changes the variable resistance load to compensate for changes in ambient temperature.

While the back pressure valve 24 is desired, it should be pointed out that it can be omitted, but the load on the compressor may vary as much as 25%, and thus a larger generator 25 would be needed, together with a means for sensing the load on the gas compressor and varying the variable resistance load so that the total load on the engine 10 would remain constant.

The system 11 for controlling the fuel mixture to engine 10 preferably adjusts the mixture so that just enough combustibles are present to remove the corrosive compounds.

The foregoing disclosure and description of the invention are illustrative and explanatory thereof and various changes in the size, shape and materials, as well as in the details of the illustrated construction, and in the process, may be made within the scope of the appended claims without departing from the spirit of the invention.

What is claimed is:

1. Inert gas generating system comprising:
compressor means for compressing inert gas,
an internal combustion engine driving said compressor means,
said engine sized relative to said compressor to develop excess horsepower over that required to drive said compressor means and generating sufficient exhaust gases to completely load said compressor,
means controlling the air-fuel ratio to said engine to provide a slight excess of fuel over the amount needed for stiochiometric combustion,
means connected to the exhaust of said engine for reacting the exhaust gases from the engine over a catalyst selected from the group consisting of platinum and palladium,
said compressor means connected to and receiving sufficient exhaust gases from said reacting means to fully load said compressor means,
and means for loading said engine to obtain operation of the engine at a horsepower level which will provide sufficient exhaust gases to fully load said compressor means by absorbing the remaining energy delivered by said engine.

2. Inert gas generating system comprising:
compressor means for compressing inert gas,
an internal combustion engine driving said compressor means,
said engine sized relative to said compressor to develop excess horsepower over that required to drive said compressor means and generating sufficient exhaust gases to completely load said compressor,
means controlling the air-fuel ratio to said engine to provide a slight excess of fuel over the amount needed for stiochiometric combustion,
means connected to the exhaust of said engine for reacting the exhaust gases from the engine over a catalyst selected from the group consisting of platinum and palladium,
said compressor means connected to and receiving sufficient exhaust gases from said reacting means to fully load said compressor means,
means holding a constant back pressure on the compressor means,
and means for loading said engine to obtain operation of the engine at a horsepower level which will provide sufficient exhaust gases to fully load said compressor means by absorbing the remaining energy delivered by said engine.

3. Inert gas generating system comprising:
compressor means for compressing inert gas,
an internal combustion engine driving said compressor means,
said engine sized relative to said compressor to develop excess horsepower over that required to drive said compressor means and generating sufficient exhaust gases to completely load said compressor,
means controlling the air-fuel ratio to said engine to provide a slight excess of fuel over the amount needed for stoichiometric combustion,
means connected to the exhaust of said engine for reacting the exhaust gases from the engine over a catalyst selected from the group consisting of platinum and palladium,
said compressor means connected to and receiving sufficient exhaust gases from said reacting means to fully load said compressor means,
and means for loading said engine to obtain operation of the engine at a horsepower level which will provide sufficient exhaust gases to fully load said compressor means by absorbing the remaining energy delivered by said engine including, an electric generator driven by said engine and absorbing a constant selected horsepower from said engine, means operating continuously and drawing a constant level of power from said generator, means operating intermittently and drawing power from said generator, and means responsive to ambient temperature changes and sensitive to the amount of power being drawn from said generator for selectively connecting varying resistance loads to said generator in an amount to give a constant load on said generator.

4. Inert gas generating system comprising:
compressor means for compressing inert gas,
an internal combustion engine driving said compressor means,
said engine sized relative to said compressor to develop excess horsepower over that required to drive said compressor means and generating sufficient exhaust gases to completely load said compressor,
means controlling the air-fuel ratio to said engine to provide a slight excess of fuel over the amount needed for stiochiometric combustion,
means connected to the exhaust of said engine for reacting the exhaust gases from the engine over a catalyst selected from the group consisting of platinum and palladium,
said compressor means connected to and receiving sufficient exhaust gases from said reacting means to fully load said compressor means,
means positioned downstream of the compressor means and holding a constant back pressure on the compressor means,
and means for loading said engine to obtain operation of the engine at a horsepower level which will provide sufficient exhaust gases to fully load said compressor means by asborbing the remaining energy delivered by said engine including, an electric generator driven by said engine and absorbing a constant selected horsepower from said engine, means operating continuously and drawing a constant level of power from said generator, means operating intermittently and drawing power from said generator, and means responsive to ambient temperature changes and sensitive to the amount of power being drawn from said generator for selectively connecting varying resistance loads to said generator in an amount to give a constant load on said generator.

References Cited

UNITED STATES PATENTS

| | | | |
|---|---|---|---|
| 3,389,972 | 6/1968 | Pottharst | 23—281 |
| 3,232,885 | 2/1966 | Henke | 252—372 |
| 2,392,711 | 1/1946 | Willenborg | 23—281 |
| 2,239,043 | 4/1941 | Kuehn | 322—97 |
| 2,037,158 | 4/1936 | Doelling | 23—281 |

JAMES H. TAYMAN, JR., Primary Examiner

U.S. Cl. X.R.

23—2, 281, 260; 252—372; 60—29; 322—7, 97; 123—3